(12) United States Patent
Georges Des Aulnois et al.

(10) Patent No.: US 10,768,051 B2
(45) Date of Patent: Sep. 8, 2020

(54) PROCESS AND DEVICE INCLUDING A FIXED CAVITY WITH A FREE SPECTRAL RANGE FOR CHARACTERIZING AN OPTICAL SOURCE

(71) Applicant: BLUE INDUSTRY AND SCIENCE, Paris (FR)

(72) Inventors: Johann Georges Des Aulnois, Versailles (FR); Benjamin Szymanski, Paris (FR); Bertrand Hardy-Baranski, Chatou (FR)

(73) Assignee: BLUE INDUSTRY AND SCIENCE, Paris (FR)

( * ) Notice: Subject to any disclaimer, the term of this patent is extended or adjusted under 35 U.S.C. 154(b) by 0 days.

(21) Appl. No.: 16/316,409

(22) PCT Filed: Jul. 6, 2017

(86) PCT No.: PCT/EP2017/067017
§ 371 (c)(1),
(2) Date: Jan. 9, 2019

(87) PCT Pub. No.: WO2018/011063
PCT Pub. Date: Jan. 18, 2018

(65) Prior Publication Data
US 2019/0293491 A1    Sep. 26, 2019

(30) Foreign Application Priority Data

Jul. 12, 2016 (FR) ..................................... 16 56663

(51) Int. Cl.
*G01J 9/02* (2006.01)
*G02B 26/08* (2006.01)

(52) U.S. Cl.
CPC ............ *G01J 9/0246* (2013.01); *G02B 26/08* (2013.01); *G01J 2009/0257* (2013.01)

(58) Field of Classification Search
CPC .. G01J 9/0246; G01J 2009/0257; G02B 26/08
See application file for complete search history.

(56) References Cited

U.S. PATENT DOCUMENTS 6,088,142 A    7/2000  Cao et al.
6,498,800 B1   12/2002 Watterson et al.
(Continued)

OTHER PUBLICATIONS

French Search Report from French Patent Application No. 1656663, dated May 22, 2017.
(Continued)

*Primary Examiner* — Hwa Andrew Lee
(74) *Attorney, Agent, or Firm* — Greer, Burns & Crain, Ltd.

(57) ABSTRACT

A process for characterizing an optical source including a fixed cavity having a free spectral range, the process including: generating a first radiation; receiving at least a portion of this first radiation by at least one sensor; measuring a signal by each sensor and for each scanned state of the source; on the basis of the signals measured, and for each scanned state of the source, calculating a first data item which represents the wavelength of the first radiation, the calculation including, for each scanned state of the source, a selection of a selected value of the first data item from a plurality of possible values, the selection including the elimination of the values of the first data item which do not correspond to a modulo constant of the free spectral range of the fixed cavity expressed according to the units of the first data item.

14 Claims, 3 Drawing Sheets

(56) References Cited

U.S. PATENT DOCUMENTS

| | | | |
|---|---|---|---|
| 2003/0035120 A1* | 2/2003 | Myatt | G01J 9/0246 |
| | | | 356/519 |
| 2006/0215167 A1 | 9/2006 | O'Gorman et al. | |
| 2008/0285606 A1* | 11/2008 | Kippenberg | G02F 1/39 |
| | | | 372/32 |
| 2019/0369259 A1* | 12/2019 | Fourguette | G01S 7/4818 |

OTHER PUBLICATIONS

International Search Report from International Patent Application No. PCT/EP2017/067017, dated Sep. 26, 2017.

* cited by examiner

PROCESS AND DEVICE INCLUDING A FIXED CAVITY WITH A FREE SPECTRAL RANGE FOR CHARACTERIZING AN OPTICAL SOURCE

BACKGROUND

The present invention relates to a method for characterizing an optical source. It also relates to a device for characterizing an optical source, and a system comprising such a device.

Such a device allows a user to characterize an optical source, for example a wavelength of a radiation emitted by this optical source.

Different devices are known in the state of the art for measuring a wavelength of a radiation emitted by an optical source.

These devices need to explore a range of possible wavelengths in order to determine which is the wavelength, from among those in the range, that is emitted by the source. This exploration can typically be carried out:
  with a costly solution, and exploration by a photodiode array. Existing solutions propose Fabry-Perot configurations without moving mechanical parts, but with arrays as detector. The aspect without moving parts is a definite advantage for robustness and reliability. On the other hand, using detection arrays is a drawback with respect to the cost, in particular when it is a question of measuring wavelengths beyond 1100 nm and silicon can no longer be used. It is then necessary to turn to more expensive materials such as InGaAs for telecom wavelengths, or even PbSe or MCT for the mid-infrared. The arrays typically cost several thousand euros.
  with a slow solution, and exploration by tunable Fabry-Perot. Tunable Fabry-Perot solutions do not use arrays, but only one or several photodiodes. However, in order to carry out the desired exploration and to obtain the desired information (position of the Fabry-Perot transmission peak), it is necessary to move one of the mirrors of the Fabry-Perot. This scanning significantly slows down the measurement. Indeed, an acquisition is necessary for each position of the mirror, instead of acquiring the entire interferogram simultaneously when using array detectors. For a typical response time of 0.1 ms and a measurement of 100 mirror positions the minimum time for one measurement is thus 10 ms, limiting the refresh rate to 100 Hz (without taking account of the processing time).

The aim of the present invention is to propose a method and/or a device for characterizing an optical source, which allows characterization that is more economical and/or quicker than the state of the art.

SUMMARY

This objective is achieved with a method for characterizing an optical source, said optical source comprising a fixed cavity having a free spectral range, said method comprising:
  generating a first radiation by the source according to a state of the source or different explored states of the source,
  receiving at least a part of this first radiation by at least one sensor, each sensor comprising a Fabry-Perot etalon followed by a photodiode,
  measuring a signal by each sensor and for each explored state of the source, as a function of the at least one part of the first radiation received by this sensor at this explored state of the source,
  starting from the measured signals and for each explored state of the source, calculating a first data item representative of the wavelength of the first radiation, the calculation comprising, for each explored state of the source, selecting a selected value of the first data item from among several possible values, said selection comprising eliminating the values of the first data item that do not correspond to a constant modulo the free spectral range of the fixed cavity expressed in the units of the first data item.

The constant can, for example, in the method according to the invention, be calculated or determined or recorded before the elimination step. The constant can be input for example by a user before the elimination step.

The free spectral range of the fixed cavity can for example, in the method according to the invention, be recorded before the elimination step. The free spectral range of the fixed cavity can be input for example by a user before the elimination step.

The different states of the source are preferably distinguished by a difference of a physical parameter of the source which has an influence on a wavelength of the first radiation emitted by the source.

Each sensor preferably does not comprise a photodiode array.

The Fabry-Perot etalon of each sensor preferably does not comprise any moving part.

The first data item illustrating the wavelength of the first radiation can be:
  the wavelength of the first radiation, or
  the temporal frequency of the first radiation, or
  the temporal period of the first radiation, or
  the wave number of the first radiation.

The selection can also eliminate the values of the first data item situated outside a spectral area range of the first radiation. In this case:
  each Fabry-Perot etalon can have a transmission intensity curve of the first radiation, as a function of the wavelength of the first radiation, preferably having a period that is greater than or equal to the spectral area range of the first radiation, and/or
  receiving at least a part of the first radiation preferably comprises reception by several sensors, each comprising a Fabry-Perot etalon followed by a photodiode, each Fabry-Perot etalon having a transmission intensity curve of the first radiation as a function of the wavelength of the first radiation, the transmission curves of the different Fabry-Perot etalons together forming an overall transmission intensity curve of the first radiation, as a function of the wavelength of the first radiation, preferably having a period that is greater than or equal to the spectral area range of the first radiation.

The at least one sensor preferably comprises several sensors, the different Fabry-Perot etalons of the different sensors preferably comprising at least one pair of two Fabry-Perot etalons including:
  a first Fabry-Perot etalon having a first transmission intensity curve of the first radiation, as a function of the wavelength of the first radiation, and
  a second Fabry-Perot etalon having a second transmission intensity curve of the first radiation, as a function of the wavelength of the first radiation, such that:
one and the same wavelength of the first radiation corresponds to both a maximum slope of the first transmission curve and a slope of the second transmission curve that is less than or equal to, in absolute value, 10% of this maximum slope, and/or
one and the same wavelength of the first radiation corresponds to both a maximum slope of the second transmission curve and a slope of the first transmission curve that is less than or equal to, in absolute value, 10% of this maximum slope.

The method according to the invention can comprise, before performing the selection eliminating the values of the first data item not corresponding to the constant modulo the free spectral range of the fixed cavity, determination or knowledge of the constant. Determination of the constant can comprise, in the case of generation of the first radiation by the source according to different explored states of the source:
a preliminary calculation of the first data item for each explored state of the source, and
starting from the preliminary calculation of the first data item for all of the different explored states of the source, determination of the constant.

Selecting a selected value of the first data item can comprise, after elimination of the values of the first data item not corresponding to a constant modulo the free spectral range, a final selection of the selected value, preferably by a least squares method.

The source can be an optical parametric oscillator or a laser.

The source can be an at least doubly resonant source, comprising two cavities sharing one and the same radiation-generating crystal, including:
a moveable cavity generating the first radiation, and
the fixed cavity generating a second radiation.

The method according to the invention can also comprise a calculation, for each explored state of the source, of a second data item representative of the wavelength of the second radiation as a function of the calculation of the first data item representative of the wavelength of the first radiation.

According to another feature of the invention, a device is proposed for characterizing an optical source, said device comprising:
at least one sensor, arranged in order to receive at least a part of a first radiation generated by a source according to a state of the source or different explored states of the source, each sensor comprising a Fabry-Perot etalon followed by a photodiode, each sensor being arranged in order to measure a signal for each explored state of the source as a function of the at least one part of the first radiation received by this sensor at this explored state of the source,
a calculation unit, arranged and/or programmed in order to calculate, starting from the measured signals by each sensor and for each explored state of the source, a first data item representative of the wavelength of the first radiation, the calculation unit being arranged and/or programmed in order to carry out a selection, for each explored state of the source, of a selected value of the first data item from among several possible values, said selection comprising eliminating values of the first data item that do not correspond to a constant modulo a free spectral range expressed in the units of the first data item.

The calculation unit is preferably arranged and/or programmed in order to know the constant.

The device according to the invention can comprise means for calculating or determining or recording the constant. The device according to the invention can comprise communication means or input means arranged in order to indicate the constant to the device according to the invention.

The device according to the invention can comprise means for recording the free spectral range of the fixed cavity. The device according to the invention can comprise communication means or input means arranged in order to indicate the free spectral range of the fixed cavity to the device according to the invention.

The different states of the source are preferably distinguished by a difference of a physical parameter of the source which has an influence on a wavelength of the first radiation emitted by the source.

The source preferably does not form part of the device according to the invention.

The calculation unit can be arranged and/or programmed in order to control in what state the source is found and/or receive items of information on the state of the source or the different explored states of the source.

The calculation unit can also be arranged and/or programmed in order to:
control in what state the source is found and/or receive items of information on the state of the source or the different explored states of the source, and
associate or synchronize each explored state of the source with the signal measured by each sensor for this explored state of the source.

Each sensor preferably does not comprise a photodiode array.

The Fabry-Perot etalon of each sensor preferably does not comprise any moving part.

The first data item illustrating the wavelength of the first radiation can be:
the wavelength of the first radiation, or
the temporal frequency of the first radiation, or
the temporal period of the first radiation, or
the wave number of the first radiation.

The calculation unit can be arranged and/or programmed in order to carry out the selection by also eliminating the values of the first data item situated outside a spectral area range of the first radiation. In this case:
each Fabry-Perot etalon can have a transmission intensity curve of the first radiation, as a function of the wavelength of the first radiation, preferably having a period that is greater than or equal to the spectral area range of the first radiation.
the at least one sensor can comprise several sensors, each comprising a Fabry-Perot etalon followed by a photodiode, each Fabry-Perot etalon having a transmission intensity curve of the first radiation as a function of the wavelength of the first radiation, the transmission curves of the different Fabry-Perot etalons together forming an overall transmission intensity curve of the first radiation, as a function of the wavelength of the first radiation, preferably having a period that is greater than or equal to the spectral area range of the first radiation.

The at least one sensor preferably comprises several sensors, the different Fabry-Perot etalons of the different sensors preferably comprising at least one pair of two Fabry-Perot etalons including:

a first Fabry-Perot etalon having a first transmission intensity curve of the first radiation, as a function of the wavelength of the first radiation, and a second Fabry-Perot etalon having a second transmission intensity curve of the first radiation, as a function of the wavelength of the first radiation, such that:

one and the same wavelength of the first radiation corresponds to both a maximum slope of the first transmission curve and a slope of the second transmission curve that is less than or equal to, in absolute value, 10% of this maximum slope, and/or one and the same wavelength of the first radiation corresponds to both a maximum slope of the second transmission curve and a slope of the first transmission curve that is less than or equal to, in absolute value, 10% of this maximum slope.

The calculation unit can be arranged and/or programmed so that, before performing the selection eliminating the values of the first data item not corresponding to the constant modulo the free spectral range of the fixed cavity, it determines or knows the constant. In order to determine the constant, the calculation unit can also be arranged and/or programmed in order to:

determine preliminarily the first data item for each explored state of the source, and starting from the preliminary calculation of the first data item for all of the different explored states of the source, determine the constant.

The calculation unit can be arranged and/or programmed in order to carry out the selection comprising, after elimination of the values of the first data item not corresponding to a constant modulo the free spectral range, a final selection of the selected value, preferably by a least squares method.

The calculation unit can be arranged and/or programmed in order to calculate, for each explored state of the source, a second data item representative of the wavelength of the second radiation as a function of the calculation of the first data item representative of the wavelength of the first radiation.

According to yet another aspect of the invention, a system is proposed, comprising:

an optical source comprising a fixed cavity having a free spectral range, said source being arranged in order to generate a first radiation according to a state of the source or according to different explored states of the source, and a device for characterizing this source according to the invention.

The source can be an optical parametric oscillator or a laser.

The source can be an at least doubly resonant source, comprising two cavities sharing one and the same radiation-generating crystal, including:

a moveable cavity generating the first radiation, and the fixed cavity generating a second radiation.

BRIEF DESCRIPTION OF THE DRAWINGS

Other advantages and features of the invention will become apparent on reading the detailed description of implementations and embodiments which are in no way limitative, and from the following attached diagrams:

FIG. 7 shows the difference between the measurements calculated or simulated after restriction of the wave numbers possibly emitted and the wave numbers actually emitted:

before calculation of the modulo (circles) and after calculation of the modulo (stars)

DETAILED DESCRIPTION

As these embodiments are in no way limitative, variants of the invention can be considered in particular comprising only a selection of the characteristics described or illustrated hereinafter, in isolation from the other characteristics described or illustrated (even if this selection is isolated within a phrase containing these other characteristics), if this selection of characteristics is sufficient to confer a technical advantage or to differentiate the invention with respect to the state of the prior art. This selection comprises at least one, preferably functional, characteristic without structural details, and/or with only a part of the structural details if this part alone is sufficient to confer a technical advantage or to differentiate the invention with respect to the state of the prior art.

Firstly, with reference to FIGS. 1 and 2, a system 100 according to the invention will be described, comprising a device 10 according to the invention.

The system 100 comprises an optical source 1 comprising a fixed cavity 2 delimited by two mirrors 2a, 2b having a free spectral range, said source being arranged in order to generate, according to a state of the source or according to different explored states of the source, a first radiation 3 which depends on the state of the source during the generation of this radiation 3.

The free spectral range corresponds to the distance (in wavelength, frequency, period, wave number, etc.) between two successive resonance peaks of the cavity 2.

The source 1 is typically an optical parametric oscillator (OPO) or a laser.

The source 1 is an at least doubly resonant source, comprising two cavities sharing one and the same radiation-generating crystal 9, including:

a moveable cavity 7, delimited by two mirrors 7a, 7b and generating the first radiation 3, and the fixed cavity 2 generating a second radiation 8.

The doubly resonant source 1 comprises the nonlinear crystal 9 and three mirrors 7a and 2a and 2b/7b, two of which (2a and 2b/7b) are placed directly on the crystal 9, and a moveable mirror 7a.

One of these three mirrors 2b/7b is common to the two cavities 2 and 7, In the present description, different "states" of the source 1 are distinguished by a difference of a physical parameter of the source 1 which has an influence on the wavelength of the first radiation 3 emitted by the source 1.

Figure 1:
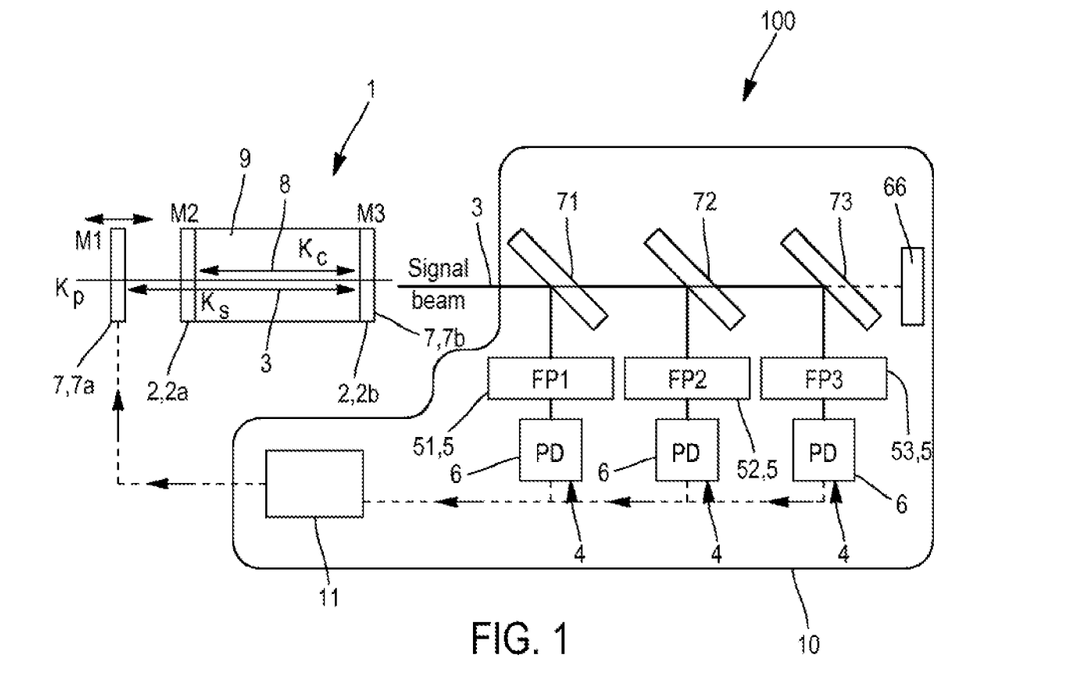
FIG. 1 is a diagrammatic view of a preferred embodiment of the system 100 according to the invention, comprising a preferred embodiment of the device 10 according to the invention.

In the present description of FIG. 1, the non-limitative case will be considered in which the different states of the source 1 are differentiated by different positions of the mirror 7a.

Several states of the source 1 will be explored so as to vary the wavelength of the first radiation 3 (even if different states of the source 1 can correspond to the same wavelength of the first radiation 3) but retaining the free spectral range of the cavity 2.

Hereinafter, the particular but non-limitative case of a source 1 which is a doubly resonant optical parametric oscillator will be considered.

The source 1 is for example a source with reference X-FLR8 manufactured by Blue Industry and Science.

The system 100 also comprises the device 10 according to the invention for characterizing this source 1.

The device 10 comprises at least one sensor 4 (preferably at least two or ideally at least three sensors 4), each sensor 4 being arranged in order to receive at least a part of the first radiation 3 generated by the source 1 according to a state of the source or different explored states of the source 1, each sensor 4 comprising a Fabry-Perot etalon 5 followed by a photodiode 6.

Each sensor 4 is arranged in order to measure a signal for each explored state of the source 1 as a function of the at least one part of the first radiation 3 received by this sensor 4 at this explored state of the source.

The device 10 comprises at least one semi-reflective and/or dichroic mirror 71, 72; 73 arranged in order to distribute the radiation 3 to the different sensors 4.

The light intensity of each of the parts of the radiation 3 arriving just upstream of each of the sensors 4, i.e.:

between the mirror (or dichroic) 71 and the Fabry-Perot 51 for the first sensor, between the mirror (or dichroic) 72 and the Fabry-Perot 52 for the second sensor, between the mirror (or dichroic) 73 and the Fabry-Perot 53 for the third sensor, is known either by initial calibration (typically during manufacture of the device 10 or at the factory) or by using:

an optional reference sensor 66 (without Fabry-Perot) arranged in order to measure an intensity of a part of the radiation 3 without Fabry-Perot, and knowledge of the coefficients of reflection and transmission of each of the mirrors 71, 72, and 73.

Each photodiode 6, 66 is for example a photodiode of reference G6854-01 manufactured by Hamamatsu.

Each etalon 5 is for example an etalon from the OP-7423 series manufactured by LightMachinery.

Each sensor 4 does not comprise a photodiode array, but comprises a single photodiode 6.

The Fabry-Perot etalon 5 of each sensor 4 does not comprise any moving part.

The device 10 comprises a calculation unit 11.

The unit 11 comprises only technical means, preferably electronic and/or hardware and/or software means.

The calculation unit 11 is arranged and/or programmed in order to:

control in what state the source 1 is found and/or receive items of information on the state of the source 1 or the different explored states of the source 1, and associate or synchronize each explored state of the source 1 with the signal measured by each sensor 4 for this explored state of the source 1.

Thus, the signal of each photodiode 6 gives an item of information on the transmission of the radiation 3 though each Fabry-Perot.

The calculation unit 11 is arranged and/or programmed in order to calculate, starting from the signals measured by each sensor 4 and for each explored state of the source 1, a first data item (for example $k_s$) representative of the wavelength of the first radiation 3, for each explored state of the source 1, the calculation unit 11 being arranged and/or programmed in order to carry out a selection, for each explored state of the source 1 of a selected value of the first data item (for example $k_s$) from among several possible values.

The first data item illustrating the wavelength of the first radiation is a data item that is dependent on or is a function of the wavelength of the first radiation.

The first data item illustrating the wavelength of the first radiation is for example:

the wavelength of the first radiation, or the temporal frequency of the first radiation, or the temporal period of the first radiation, or as described in this illustrative but non-limitative example, the wave number $k_s$ of the first radiation 3.

The first data item illustrating the wavelength of the first radiation can also be any data item proportional to this wavelength of the first radiation or this temporal frequency of the first radiation, or this temporal period of the first radiation, or this wave number $k_s$ of the first radiation 3.

More precisely, the calculation unit 11 is arranged and/or programmed in order to:

know a constant "b"; the calculation unit 11 is, in the case of generation of the first radiation 3 by the source 1 according to different explored states of the source 1, arranged and/or programmed in order to determine the constant "b", and to this end is arranged and/or programmed in order to:

calculate preliminarily the first data item $k_s$ for each explored state of the source 1, eliminating values of the first data item $k_s$ situated outside a spectral area range 15 of the first radiation 3 and selecting a value of the first data item $k_s$ for each explored state of the source 1, preferably by a least squares method starting from the preliminary calculation of the first data item $k_s$ for all of the different explored states of the source 1, determine the constant "b".

in order to calculate, starting from the signals measured by each sensor 4 and for each explored state of the source 1, the first data item $k_s$ representative of the wavelength of the first radiation 3 for each explored state of the source 1, selecting a selected value of the first data item $k_s$ from among several possible values, the calculation unit 11 being arranged and/or programmed:

to carry out an elimination (that forms part of the selection) of the values of the first data item $k_s$ situated outside the spectral area range 15 of the first radiation 3 to carry out an elimination (that forms part of the selection) of the values of the first data item $k_s$, that do not correspond to the constant "b" modulo the free spectral range of the fixed cavity 2 expressed in the units of the first data item $k_s$, then to carry out, after the two previous eliminations, a final selection (that forms part of the selection) of the selected value, preferably by a least squares method.

The calculation unit 11 is arranged and/or programmed in order to calculate, for each explored state of the source 1, a second data item $k_c$ representative of the wavelength of the second radiation 8 as a function of the calculation of the first data item $k_s$ representative of the wavelength of the first radiation 3.

The second data item $k_C$ illustrating the wavelength of the second radiation 8 is:
the wavelength of the second radiation, or
the frequency of the second radiation, or
as described in this illustrative but non-limitative example, the wave number $k_c$ of the second radiation 8.

The manner in which the calculation unit 11 is arranged and/or programmed will be described in more detail below with reference to an embodiment of the method according to the invention implemented by the device 10.

The calculation unit 11 is arranged and/or programmed in order to know the constant b.

The device 10 comprises means (more precisely the unit 11) arranged in order to calculate and/or determine and/or record the constant b.

The device 10 comprises communication means and/or input means arranged in order to indicate the constant b to the device 10 (more precisely the unit 11).

The calculation unit 11 is arranged and/or programmed in order to know the free spectral range of the fixed cavity 2.

The device 10 comprises:
means (more precisely the unit 11) for recording the free spectral range of the fixed cavity 2, and/or
communication means and/or input means arranged in order to indicate the free spectral range of the fixed cavity 2 to the device 10 (more precisely the unit 11).

The communication or input means are not obligatory, in particular since the device 10 can be dedicated to only carrying out measurements on a single type or a single reference of source 1, the free spectral range of the fixed cavity of which is unchanged from one source 1 to another source 1.

The source 1 preferably does not form part of the device 10, The device 10 can be marketed as a device for characterizing or testing a source 1 independently of the source 1.

Figure 2:
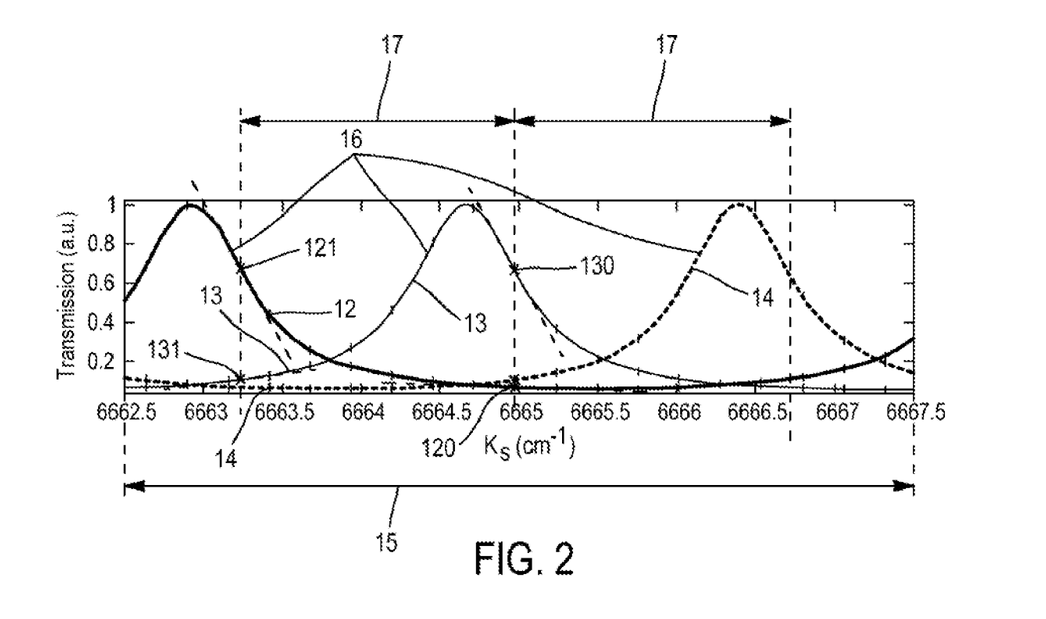
FIG. 2 shows the transmission curves of the three Fabry-Perots 5 of the device 10 in the emission spectral range 15 of the source 1 of the device 10; the measurement noises are shown diagrammatically by vertical lines on these curves.

With reference to FIG. 2, each Fabry-Perot etalon 5 has a transmission intensity curve 12, 13, 14 of the first radiation 3, as a function of the wavelength of the first radiation 3, having a period that is greater than or equal to the spectral area range 15 of the first radiation 3.

Each Fabry-Perot etalon 5 has a transmission intensity curve 12, 13, 14 of the first radiation 3, as a function of the wavelength of the first radiation 3, the transmission curves of the different Fabry-Perot etalons 5 together forming an overall transmission intensity curve 16 of the first radiation, as a function of the wavelength of the first radiation 3, having a period that is greater than or equal to the spectral area range 15 of the first radiation.

The at least one sensor 4 comprises several sensors 4, the different Fabry-Perot etalons 5 of the different sensors 4 comprising at least one pair of two Fabry-Perot etalons 5 (preferably only Fabry-Perot etalon pairs), each pair comprising:

a first Fabry-Perot etalon having a first transmission intensity curve 13 of the first radiation 3, as a function of the wavelength of the first radiation 3, and a second Fabry-Perot etalon having a second transmission intensity curve 12 of the first radiation 3, as a function of the wavelength of the first radiation 3, such that:

one and the same wavelength of the first radiation 3 corresponds to both a maximum slope (i.e. the first derivative) 130 of the first transmission curve 13 and a slope 120 of the second transmission curve 12 that is less than or equal to, in absolute value, 10% of this maximum slope 130, and/or one and the same wavelength of the first radiation 3 corresponds to both a maximum slope 121 of the second transmission curve 12 and a slope 131 of the first transmission curve 13 that is less than or equal to, in absolute value, 10% of this maximum slope 121.

It is noted that this is valid for all of the pairs 12, 13 or 13, 14 or 14, 12 of the transmission curves of all of the Fabry-Perot etalons 5 of the device 10.

It is also noted that the slope maxima 121, 130 of one and the same sign (i.e. increasing slope or decreasing slope) of the different transmission curves 12, 13, 14 are regularly spaced apart by one and the same separation interval 17 within the area 15.

Thus, in this embodiment, Fabry-Perot etalons 5 (without moving mechanical parts) are used without imaging the interference pattern on an array detector. Only a single measurement point is made per Fabry-Perot stage 5.

In order to improve the accuracy, wavelengths are tuned across the entire emission gain bandwidth of the source 1 by modifying only a single cavity 7 of the coherent source 1. Thus, it is known that all the wavelengths are identical modulo FSR of the cavity 2 of the source 1. This gives additional information which makes it possible to attain each of the emitted wavelengths of the beams 3, 8.

This embodiment has the following advantages:

very compact: the solution can amount to less than 10 cm in length.

very quick: by using suitable electronics 11 it is possible to take a measurement at each laser pulse (>100 kHz). The invention can also operate with a continuous source 1 with a measurement at the maximum of the measurement and processing electronics 11 of the photodiodes 6. The invention is not limited by the response time of a piezoelectric transducer that would be used to move a part of a tunable Fabry-Perot.

inexpensive: it does not comprise expensive components: the non-tunable Fabry-Perot etalons 5, the photodiodes 6 without array are very economical with respect to an array system.

An embodiment of the method according to the invention implemented by the device 10 and by the system 100 will now be described with reference to FIGS. 1 to 9.

This method comprises steps 1) to 8) described below:

1) generating the first radiation 3 (and second radiation 8) by the source 1 according to a state of the source or different explored states of the source 1. The coherent source 1 is a doubly resonant OPO. A pump laser beam of wave number $k_p$ passes through the non-linear crystal 9 with periodic polarization inversion. The crystal 9 radiates two new beams: the first radiation 3 (also called signal) having wave number $k_s$ and second radiation 8 (also called complementary) having wave number $k_c$. The wave numbers are linked by the law of conservation of energy, which indicates that:

$$k_p=k_s+k_c$$

As shown diagrammatically in FIG. 1, the radiation 3 resonates in the moveable cavity 7 formed by the mirrors 7a and 7b. The radiation 8 resonates in the fixed cavity 2 between the mirrors 2a and 2b. The moveable cavity 7 has a free spectral range (FSR) Δks of approximately 0.26 cm$^{-1}$ (depending on the position of the mirror 7a); the fixed cavity 2 has a free spectral range (FSR) Δkc of 0.25 cm$^{-1}$.

The mirror 7a is moveable, for example mounted on a piezoelectric element.

The typical spectral acceptance (called parametric gain bandwidth) of the source 1 is 5 cm$^{-1}$. That is to say that the non-linear crystal 9 can only radiate over a spectral range of 5 cm$^{-1}$ if the following parameters are set: wave number of the pump laser, crystal temperature 9, no polarization inversion grating, etc.

The number of modes possibly emitted for a fixed position of the complementary cavity is therefore 5/0.25=20 modes.

The following wave numbers are assumed for each of the beams:
 wave number of the pump radiation: 9,394.5 cm$^{-1}$;
 wave number of the "signal" radiation or radiation 3: from 6,662.5 cm$^{-1}$ to 6,667.5 cm$^{-1}$ (this interval being called, in the present description, spectral area range 15 of the first radiation);
 wave number of the "complementary" radiation or radiation 8: from 2,727 cm$^{-1}$ to 2,732 cm$^{-1}$.

2) controlling, by the unit 11, in what state the source 1 is found and/or receiving, by the unit 11, items of information on the state of the source 1, or on the different explored states of the source 1; as previously explained, different states of the source 1 are explored by changing a physical parameter of the source 1 that has an influence on the wavelength of the first radiation 3 emitted by the source, for example by changing the position of the mirror 7a. Several states of the source 1 will be explored so as to vary the wavelength of the first radiation 3 (even if different states of the source 1 can correspond to the same wavelength of the first radiation 3) but retaining the free spectral range of the fixed cavity 2.

Each of the beams 3, 8 has a possible mode comb in its cavity, respectively 7, 2. Oscillation takes place if, within the parametric gain bandwidth, there is a sufficient overlap between two signal and complementary modes, i.e. if the energy conservation condition is respected.

By applying a voltage over the piezoelectric element of the mirror 7a, the moveable cavity 7 will move slightly by a few hundred nanometres. The associated mode comb will then shift and the coincidences will also be moved in accordance with the new overlaps between the beam 1 signal and beam 8 complementary modes.

Figure 3:
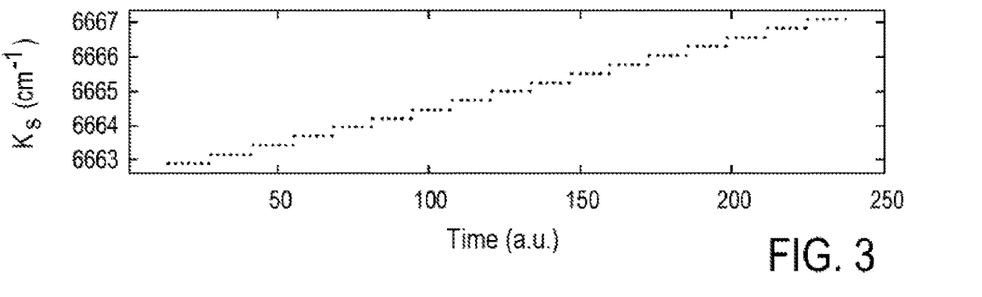
FIG. 3 shows a sequence of mode hops emitted by the source 1 of the system 100 during the movement of a mirror 7a of the source 1.
Figure 4:
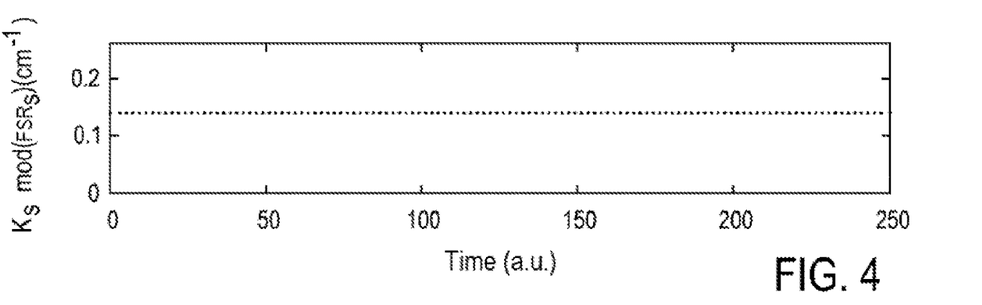
FIG. 4 shows, during this sequence, the wave number values of FIG. 3 modulo the free spectral range (FSR) of the fixed cavity 2 of the source 1.

FIG. 3 shows an example of a series of mode hops $k_s$ performed by the source 1 during the movement of the mirror 7a and FIG. 4 shows these same wave numbers $k_s$ modulo FSR of the complementary cavity 2.

Only the mirror 7a has moved. The complementary cavity 2 thus remains fixed. The comb of the wave numbers possibly emitted by the cavity 2 is thus still the same. All of the modes of the beam 8 are thus by definition equal modulo FSR of the cavity 2 (FSR dispersion is disregarded here). By energy conservation, this is also the case for those of the beam 3. This is why all the wave numbers of the beam 8 are linked by equation 1, and by energy conservation, those of the beam 3 are linked by equation 2:

$$k_c=a[\text{FSR}c] \qquad \text{equation 1}$$

$$k_s=b[\text{FSR}c] \qquad \text{equation 2}$$

where each of "a" and "b" is a constant, more precisely a real number greater than or equal to zero, the constant "b" being that already mentioned previously in the present description, [FSRc] meaning "modulo FSR of the fixed cavity FSRc", FSRc being the FSR of the fixed cavity expressed with the units of a wave number (the inverse of a length). In general, it will be noted that this principle of the invention is valid and can be generalised for any source 1 a gain medium of which (laser crystal, non-linear crystal, etc.) is contained in a resonating cavity. These two equations could naturally be expressed as a temporal frequency, or a temporal period or wavelength. For example, in the case of equation 2:

$$f_s=b'[\text{FSR}c'] \qquad \text{equation 2'}$$

$$t_s=b''[\text{FSR}c''] \qquad \text{equation 2''}$$

$$\lambda_s=b'''[\text{FSR}c'''] \qquad \text{equation 2'''}$$

where:
 each one of "b'" "b''" and "b'''" is a constant, more precisely a real number greater than or equal to zero
 $f_s$ is the temporal frequency of the radiation 3
 [FSRc'] meaning "modulo FSR of the fixed cavity FSRc'", FSRc' being the FSR of the fixed cavity expressed with the units of a temporal frequency (the inverse of a time)
 $t_s$ is the temporal period of the radiation 3
 [FSRc''] meaning "modulo FSR of the fixed cavity FSRc''", FSRc'' being the FSR of the fixed cavity expressed with the units of a temporal period (a time)
 $\lambda_s$ is the wavelength of the radiation 3
 [FSRc'''] meaning "modulo FSR of the fixed cavity FSRc'''", FSRc''' being the FSR of the fixed cavity expressed with the units of a wavelength (a length)

3) receiving a least a part of the first radiation 3 by the at least one sensor 4, and even by the several sensors 4 in the present embodiment.

4) measuring a signal by each sensor 4 and for each explored state of the source 1, as a function of the at least one part of the first radiation 3 received by this sensor 4 at this explored state of the source 1.

The Fabry-Perots 51, 52, 53 are dimensioned such that their free spectral range (FSR) is respectively 961.29 μm, 961.54 μm and 961.79 μm. There transmission as a function of the wave number in the parametric gain bandwidth is described by FIG. 2.

FIG. 2 also simulates the intensity read by each photodiode 6 for each of the modes in FIG. 3, to which has been added a white noise of 3% of the maximum was added at 3×σ, where σ represents the standard deviation of the noise.

5) associating or synchronizing, by the unit 11, of each explored state of the source 1 with the signal measured by each sensor 4 for this explored state of the source 1, 6) a priori knowledge of the constant "b"; in the case of generating the first radiation 3 by the source 1 according to different explored states of the source 1; knowledge of the constant "b" can originate from determining this constant "b", determining this constant "b" comprising:
 a. a preliminary calculation of the first data item $k_s$ representative of the wavelength of the first radiation 3 for each explored state of the source 1, the calculation comprising, for each explored state of the source 1, selecting a value of the first data item $k_s$ from among several possible values, said selection comprising:

i. eliminating the values of the first data item $k_s$ situated outside the spectral area range 15 of the first radiation 3. The objective is thus henceforth to find, starting from the items of information from the photodiodes 6, the wave numbers $k_s$ of the radiation 3 emitted by the source 1 in its possible emission range: from 6,662.5 cm$^{-1}$ to 6,667.5 cm$^{-1}$ i.e. 5 cm'. In order to attain a resolution of $2.10^{-3}$ cm$^{-1}$, the emission range 15 is sampled at 2500 points spaced apart by $2.10^{-3}$ cm$^{-1}$. A triplet of transmissions from the three photodiodes 6 corresponds to each of these points.

ii. selecting the selected value, preferably by a least squares method. If the number of sensors 4 is equal to $N_C$, and a choice is made to sample the emission range 15 with $N_P$ points (the higher $N_P$, the better the accuracy), for each state of the source 1, the $N_C$ signals measured by the $N_C$ (here $N_C$=3) sensors 4 are compared with $N_P$ (here $N_P$=2500) sets of theoretical values; each set of theoretical values comprises $N_C$ theoretical signals of the $N_C$ sensors 4 and is associated with a value of $k_S$ according to FIG. 2 or a formula or an equivalent values table, i.e. according to the transmission of the Fabry-Perot $N_C$s 51, 52, 53 as a function of the wave number $k_s$. By the least squares method, each of the measured triplets is compared with the 2500 theoretical triplets according to equation 3:

$$m_j = \sqrt{[(T^j_{th1} - T_{m1})^2 + (T^j_{th2} - T_{m2})^2 + (T^j_{th3} - T_{m3})^2]}$$ equation 3 in which $T^j_{th1}$ corresponds to the theoretical transmission of the $i^{th}$ Fabry-Perot (from the 3 possible) of the $j^{th}$ triplet (from the 2500 possible), and $T_{mi}$ corresponds to the measured transmission of the $i^{th}$ Fabry-Perot. For each of the measured triplets, the value of the wave number $k_s$ of the beam 3 is retained from among the 2500 possibilities, which minimizes the value of "$m_j$".

Figure 5:
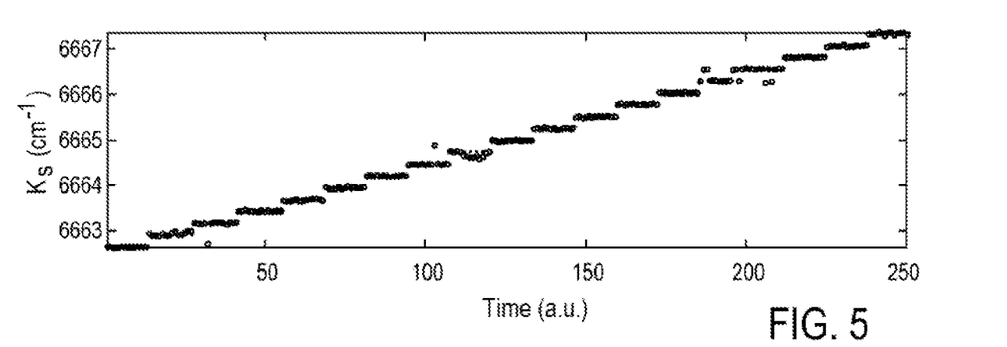
FIG. 5 shows different values of a wave number calculated according to the invention before taking account of the modulo FSR (circles) and modes actually emitted (dots)
Figure 6:
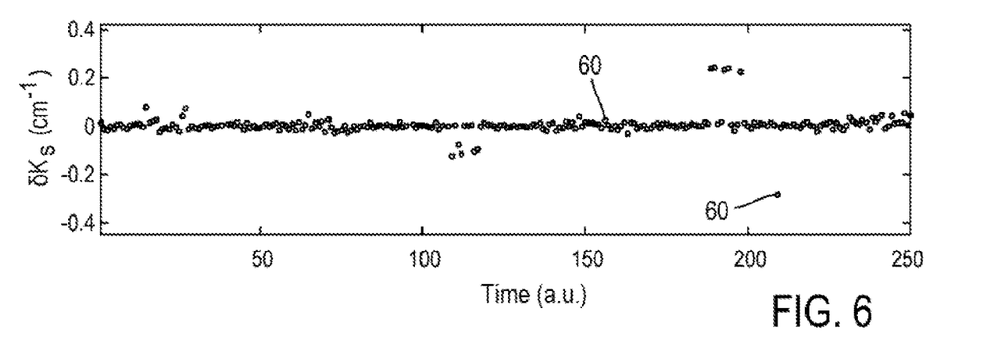
FIG. 6 shows, in the case of the values of FIG. 5, the difference between the calculated measurements and the wave number actually emitted.

These calculated wave numbers $k_s$ are shown in FIG. 5. Unfortunately, the measurement noise disturbs the calculation and degrades the result. FIG. 6 shows the difference point by point between the calculation and the wave numbers actually emitted.

b. starting from the preliminary calculation of the first data item $k_s$ for all of the different explored states of the source 1, determining the constant "b". In fact, starting from these noisy measurements in FIG. 5, it is still possible to accurately calculate "b" shown in equation 2. In fact, the measurement noise is then averaged over all of the 250 acquisitions. If this is a Gaussian white noise, the noise is then reduced by a factor greater than 15 ($\sqrt{250}$). In order to limit the effect of an aberrant number, the median (med) is used rather than the mean. Thus, let:

$$b = med(k_s^{measured}[FSR_c])$$ equation 4

In our example, b=0.1404 cm$^{-1}$. As seen above, it is now known that the source 1 can only emit at wave numbers that respect equation 2 with the value "b" that has just been calculated (equation 4).

Another alternative to the determination of b would be to record it (for example at the factory) in the device 10, but this does not make it possible to take account of the variations in b due for example to temperature variations.

7) starting from the measured signals and for each explored state of the source 1, a calculation of the first data item $k_s$ representative of the wavelength of the first radiation 3 for each explored state of the source 1, the calculation comprising, for each explored state of the source 1, selecting a selected value of the first data item $k_s$ from among several possible values, said selection comprising:

a. elimination of the theoretical values of the first data item $k_s$ situated outside the spectral area range 15 of the first radiation 3, as in the preceding step 6.a.i b. elimination of the values of the first data item $k_s$ that do not correspond to a constant "b" modulo the free spectral range of the fixed cavity 2 expressed in the units of the first data item. If it is chosen to sample the emission range 15 with $N_P$ points (the higher $N_P$, the better the accuracy), there are $N_P$ (here $N_P$=2560) sets of theoretical values; each set of theoretical values comprises $N_C$ theoretical signals of the $N_C$ sensors 4 and is associated with a value of $k_S$ according to FIG. 2 or a formula or an equivalent values table, i.e. according to the transmission of the Fabry-Perot $N_C$s 51, 52, 53 as a function of the wave number $k_s$. This elimination of the theoretical values of the first data item $k_s$ that do not correspond to a constant "b" modulo the free spectral range of the fixed cavity 2 makes it possible to reduce the number of sets of theoretical values from $N_P$ to $N_{P'}$.

c. then, after the two preceding eliminations, a final selection of the selected value, preferably by a least squares method. The least squares method is used again, limiting the possible solutions to only wave numbers of the parametric gain bandwidth (spectral range 15) respecting equation 2. If the number of sensors 4 is equal to $N_C$, and $N_R$ (here $N_R$=19) sets of possible theoretical values remain, then for each state of the source 1, the $N_C$ signals measured by the $N_C$ (here $N_C$=3) sensors 4 are compared with $N_R$ (here $N_R$=19) sets of theoretical values; each set of theoretical values comprises $N_C$ theoretical signals of the $N_C$ sensors 4 and is associated with a value of $k_s$ according to FIG. 2 or a formula or an equivalent values table, i.e. according to the transmission from Fabry-Perot $N_C$s 51, 52, 53 as a function of the wave number $k_s$. Thus, unlike in step 6, there is no longer the choice between 2500 possible triplets, but between 19 possible modes respecting the modulo condition. If b=0, there are then 20 possible modes. The calculation of the "$m_j$" of equation 3 is repeated for the 19 possible triplets only. The wave number value retained for a given measurement is that which minimizes "$m_j$" among the 19 calculated values. Thus, FIG. 7 is obtained, which presents, in addition to the results 60 (scattered circles) presented in FIG. 6, the results 70 originating from these new least squares (stars almost all in line).

Figure 7:
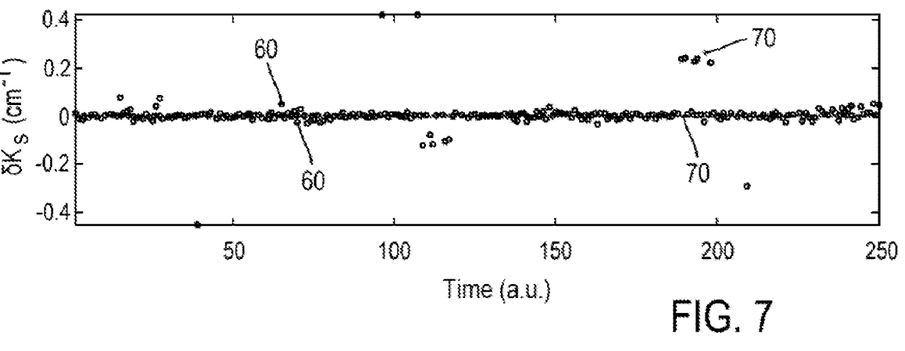

FIG. 7 shows clearly that the noise is almost zero and only one measurement point is false to a nearest FSR (measurement no 196). A filter eliminating the measurement points close to a mode hop can eliminate it. Such a filter is known for spectroscopy; indeed, the points close to the mode hops reflect a source that is not perfectly spectrally pure. They are therefore filtered in order to guarantee the quality of the measurement independently of measuring the wave number.

In the example described, the results presented in the table below are thus obtained:

|  | Without modulo (60 points) | With modulo (70 points) |
|---|---|---|
| Mean error (×10⁻³ cm⁻¹) | 22.9 | 0.04 |
| Standard deviation (3 × σ, ×10⁻³ cm⁻¹) | 19.2 | 0.0 |
| Percentage of measurements remaining after filtering (%) | 70.4 | 69.2 |

The results are markedly better using knowledge of the FSR of the fixed cavity 2. It can also be seen that filtering does not remove many more measurement points when it is applied to the first calculation (without using the modulo) rather than the second. In both cases, approximately 70% of the acquisitions remain.

Figure 8:
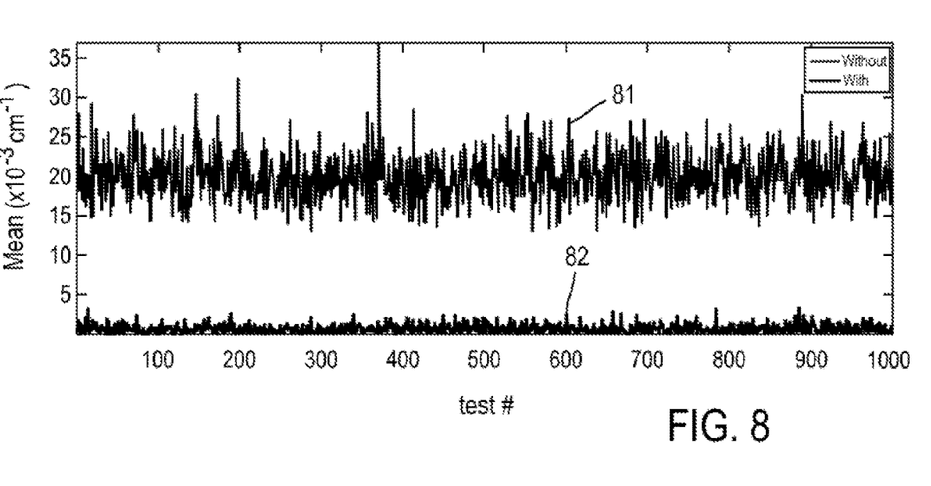
FIG. 8 shows the mean error observed over one thousand sequences of mode hops with random measurement noise using the knowledge of the FSR (curve 82) and without using the knowledge of the FSR (curve 81)
Figure 9:
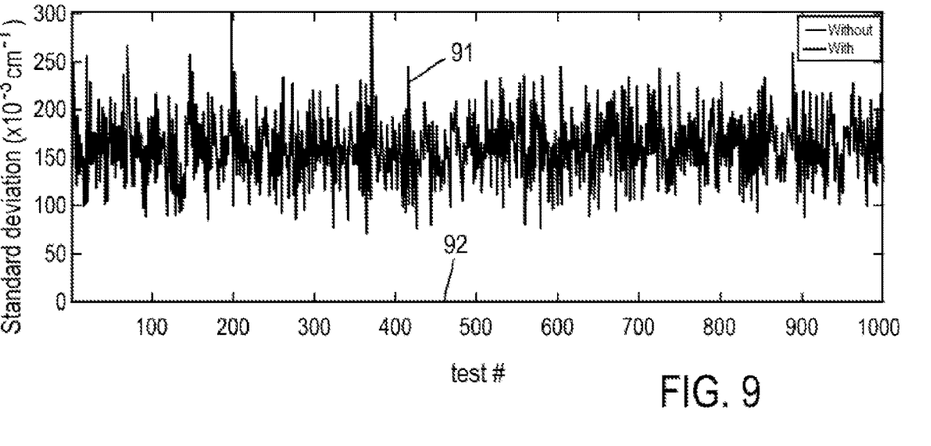
FIG. 9 shows the standard deviation at $3\times\sigma$ of the error observed over one thousand sequences of mode hops with a random measurement noise using the knowledge of the FSR (curve 92) and without using the knowledge of the FSR (curve 91).

FIG. 8 and FIG. 9 show the following results:

mean error at the first calculation (reference 81, without using the modulo) and at the second calculation (reference 82, using the modulo of equation 2), and standard deviation at the first calculation (reference 91, without using the modulo) and at the second calculation (reference 92, using the modulo of equation 2), for a thousand simulations of the sequence of mode hops, the noise being random from one sequence to the other.

The constant b is known (by the unit 11) at the moment of this step of elimination of the values of the first data item $k_s$ that do not correspond to the constant "b" modulo the free spectral range of the fixed cavity 2 of 7. The constant b can for example, in the method according to the invention, be calculated or determined (as explained in step 6) above) or recorded before this step of elimination of the values of the first data item $k_s$ that do not correspond to a constant "b" modulo the free spectral range of the fixed cavity 2 of 7). The constant b can be input for example by a user before this step of elimination of the values of the first data item $k_s$ that do not correspond to a constant "b" modulo the free spectral range of the fixed cavity 2 of 7.

The free spectral range of the fixed cavity 2 is known (by the unit 11) at the moment of this step of elimination of the values of the first data item $k_s$ that do not correspond to a constant "b" modulo the free spectral range of the fixed cavity 2 of 7. The free spectral range of the fixed cavity 2 can for example, in the method according to the invention, be recorded before the step of elimination of the values of the first data item $k_s$ that do not correspond to a constant "b" modulo the free spectral range of the fixed cavity 2 of 7. The free spectral range of the fixed cavity can be input for example by a user before the step of elimination of the values of the first data item $k_s$ that do not correspond to a constant "b" modulo the free spectral range of the fixed cavity 2 of 7.

8) In this embodiment of the method according to the invention, the moveable cavity 7 generates the first radiation 3 and the fixed cavity 2 generates the second radiation 8. This method also comprises a calculation, for each explored state of the source, of the second data item $k_c$ representative of the wavelength of the second radiation 8 as a function of the calculation of the first data item $k_s$ representative of the wavelength of the first radiation 3. In the knowledge of:

the $k_p$ value of the pump, known and controlled, and which a priori does not change during the changes of states of the source 1, and the different values of $k_s$ calculated for the different explored states of the source 1, then the different values of $k_s$ calculated for the different explored states of the source 1 are calculated with the equation:

$$k_c = k_p - k_s$$

Of course, the invention is not limited to the examples which have just been described and numerous adjustments can be made to these examples without exceeding the scope of the invention.

Thus, in variants of the embodiments previously described, which can be combined together:

the method according to the invention does not necessarily calculate the constant "b", which may already be known (for example by calibration at the factory or other). In this case, the method or device according to the invention can be implemented by exploration of a single state of the source 1, i.e. with a single dot 70 in FIG. 7;

the source 1 may only comprise a single fixed cavity 2, without a moveable cavity 7. In this case, the cavity 2 can comprise the crystal 9 between the fixed mirrors 2a and 2b. The free spectral range FSRc of the cavity 2 is always fixed; the state of the source 1 is changed for example by changing the temperature of the crystal 9, and the device and the method according to the invention are implemented this time on the basis of the following equation $k_c = b[FSRc]$, the constant b being known or determined on the same principle as previously described, and the first data item being the device and the method according to the invention can be based on measurements, by the sensors 4, on the signal of the cavity 2 rather than on the signal of the cavity 7, in a case with a moveable mirror 2a or 2b and preferably the fixed mirror 7a, for example using a gas instead of a crystal 9;

the first data item is not necessarily the wave number; it is also possible to implement the device and the method according to the invention with as first data item a temporal frequency, a temporal period, or a wavelength of the radiation received by the at least one sensor 4.

Of course, the various characteristics, forms, variants and embodiments of the invention can be combined together in various combinations inasmuch as they are not incompatible or mutually exclusive. In particular, all the variants and embodiments described above can be combined together.

The invention claimed is:

1. A method for characterizing an optical source, the optical source comprising a fixed cavity having a free spectral range, the method comprising:

generating a first radiation by the source while exploring different states of the source, the different states of the source being distinguished by a difference of a physical parameter of the source which has an influence on the wavelength of said first radiation emitted by the source;

receiving at least a part of said first radiation by at least one sensor, said at least one sensor comprising a Fabry-Perot etalon followed by a photodiode;

measuring a signal, for each of the explored states of the source using said at least one sensor, as a function of the at least one part of said first radiation received by said at least one sensor at this explored state of the source;

determining or recording a constant (b) modulo of the free spectral range of the fixed cavity expressed in units of a first data item, which is representative of the wavelength of said first radiation; and using the signal measured by said at least one sensor for each of the explored states of the source for calculating the first data item, which is representative of the wavelength of said first radiation, the calculation comprising, for each of the explored states of the source, selecting a value of the first data item, and eliminating values of the first data item that do not correspond to the constant (b) modulo of the free spectral range of the fixed cavity expressed in the units of the first data item.

2. The method according to claim 1, wherein said at least one sensor is photodiode array-free.

3. The method according to claim 1, wherein the Fabry-Perot etalon of said at least one sensor does not comprise any moving parts.

4. The method according to claim 1, wherein the first data item illustrating the wavelength of the said first radiation is:
the wavelength of said first radiation, or
the frequency of said first radiation, or
the wave number of said first radiation.

5. The method according to claim 1, wherein said selection also eliminates the values of the first data item situated outside of a known spectral area range of said first radiation.

6. The method according to claim 5, wherein each Fabry-Perot etalon has a transmission curve of the intensity of said first radiation, as a function of the wavelength of said first radiation, having a period that is greater than or equal to the known spectral area range of said first radiation.

7. The method according to claim 5, wherein the receiving of at least a part of said first radiation comprises receiving, by several sensors that each include a Fabry-Perot etalon followed by a photodiode and each Fabry-Perot etalon having a transmission intensity curve of the first radiation as a function of the wavelength of the first radiation, the transmission curves of the different Fabry-Perot etalons together forming an overall transmission intensity curve of the first radiation, as a function of the wavelength of said first radiation, having a period that is greater than or equal to the known spectral area range of said first radiation.

8. The method according to claim 1, wherein said at least one sensor comprises several sensors, the different Fabry-Perot etalons of said several sensors comprising at least one pair of two Fabry-Perot etalons including:
a first Fabry-Perot etalon having a first transmission intensity curve of said first radiation, as a function of the wavelength of said first radiation; and
a second Fabry-Perot etalon having a second transmission intensity curve of said first radiation, as a function of the wavelength of said first radiation,
such that:
one and the same wavelength of said first radiation corresponds to both a maximum slope of the first transmission curve and a slope of the second transmission curve that is less than or equal to, in absolute value, 10% of this maximum slope; or
one and the same wavelength of said first radiation corresponds to both a maximum slope of the second transmission curve and a slope of the first transmission curve that is less than or equal to, in absolute value, 10% of this maximum slope.

9. The method according to claim 1, wherein determining the constant (b) comprises, in a case of generating said first radiation by the source according to different explored states of the source, includes:
performing a preliminary calculation of the first data item for each of the different states of the source; and
determining the constant (b) using the first preliminary calculation of the first data item for all of the different states of the source.

10. The method according to claim 1, wherein selecting the value of the first data item comprises, after eliminating the values of the first data item not corresponding to the constant (b) modulo of the free spectral range, includes selecting a final value by a least squares method.

11. The method according to claim 1, wherein the source is an optical parametric oscillator or a laser.

12. The method according to claim 1, wherein the source is an at least doubly resonant source, comprising two cavities sharing a radiation-generating crystal, including:
a moveable cavity generating said first radiation; and
a fixed cavity generating a second radiation.

13. The method according to claim 12, further comprising calculating, for each of the different states of the source, a second data item representative of the wavelength of said second radiation as a function of the calculation of the first data item representative of the wavelength of said first radiation.

14. A device for characterizing an optical source, the device comprising:
a calculation unit, arranged and/or programmed to control in what state a source is found or receive items of information on a state of a source or different states of a source;
at least one sensor, arranged to receive at least a part of a first radiation generated by the source according to different states of the source, said at least one sensor comprising a Fabry-Perot etalon followed by a photodiode, said at least one sensor being arranged to measure a signal for each state of the source as a function of the at least one part of said first radiation received by said at least one sensor;
means for determining or recording a constant (b) modulo of the free spectral range of the fixed cavity expressed in units of a first data item, which is representative of a wavelength of said first radiation,
said calculation unit being arranged and/or programmed to calculate, from the signals measured by said at least one sensor and for each state of the source, the first data item which is representative of the wavelength of said first radiation, the calculation unit being arranged and/or or programmed to carry out a selection, for each state of the source, of a value of the first data item, said selection comprising eliminating values of the first data item that do not correspond to the constant (b) modulo of the free spectral range expressed in the units of the first data item.

* * * * *